July 5, 1960

H. H. DIETRICH ET AL 2,943,441

AFTERBURNER FUEL SCHEDULING CONTROL WITH ENRICHMENT
AT LOW COMPRESSOR DISCHARGE PRESSURE

Filed April 1, 1955

INVENTORS
HOWARD H. DIETRICH
JOHN D. HILLER
ROBERT LAY
MARK R. ROWE
HARRY C. ZEISLOFT

BY Craig V. Morton

THEIR ATTORNEY

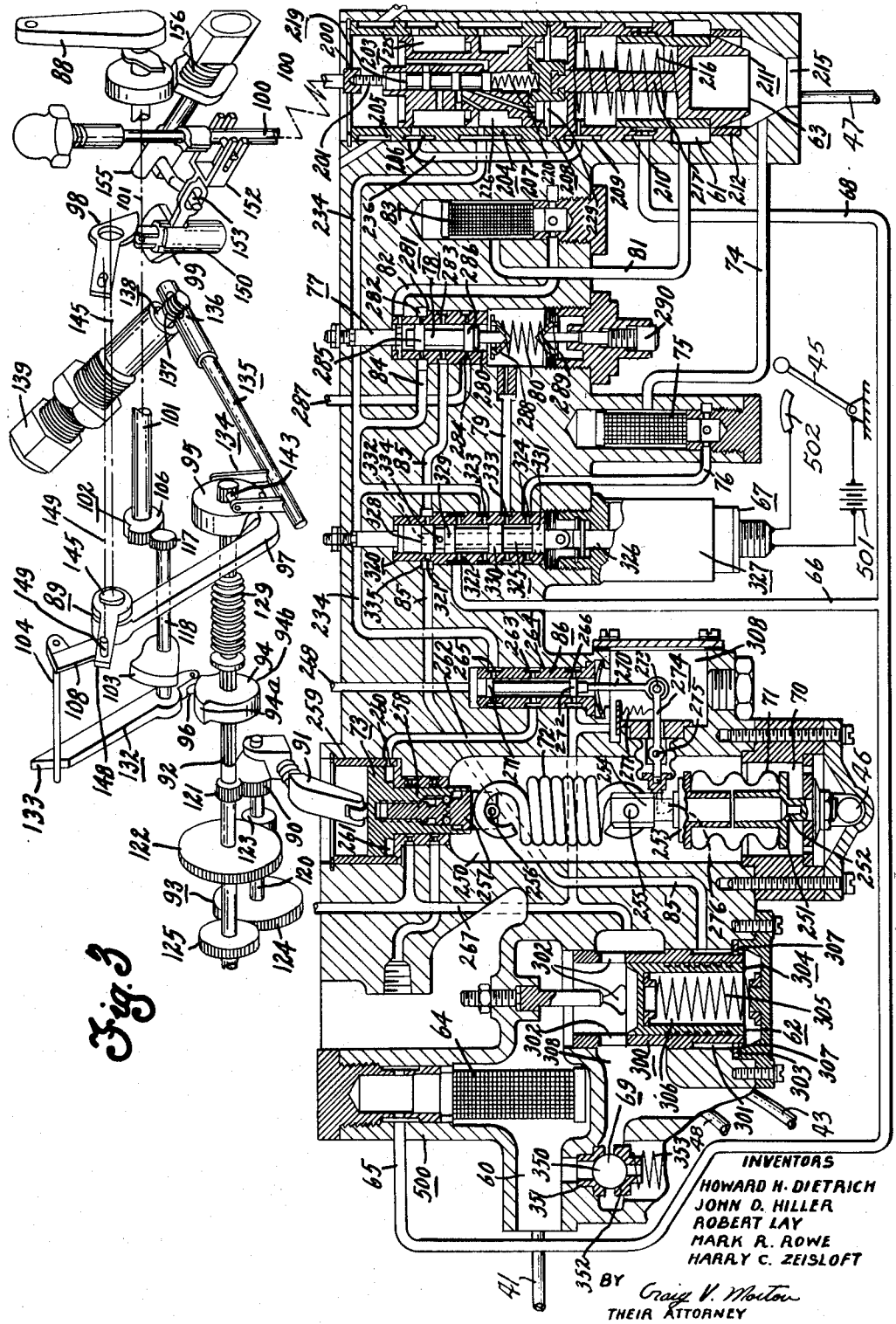

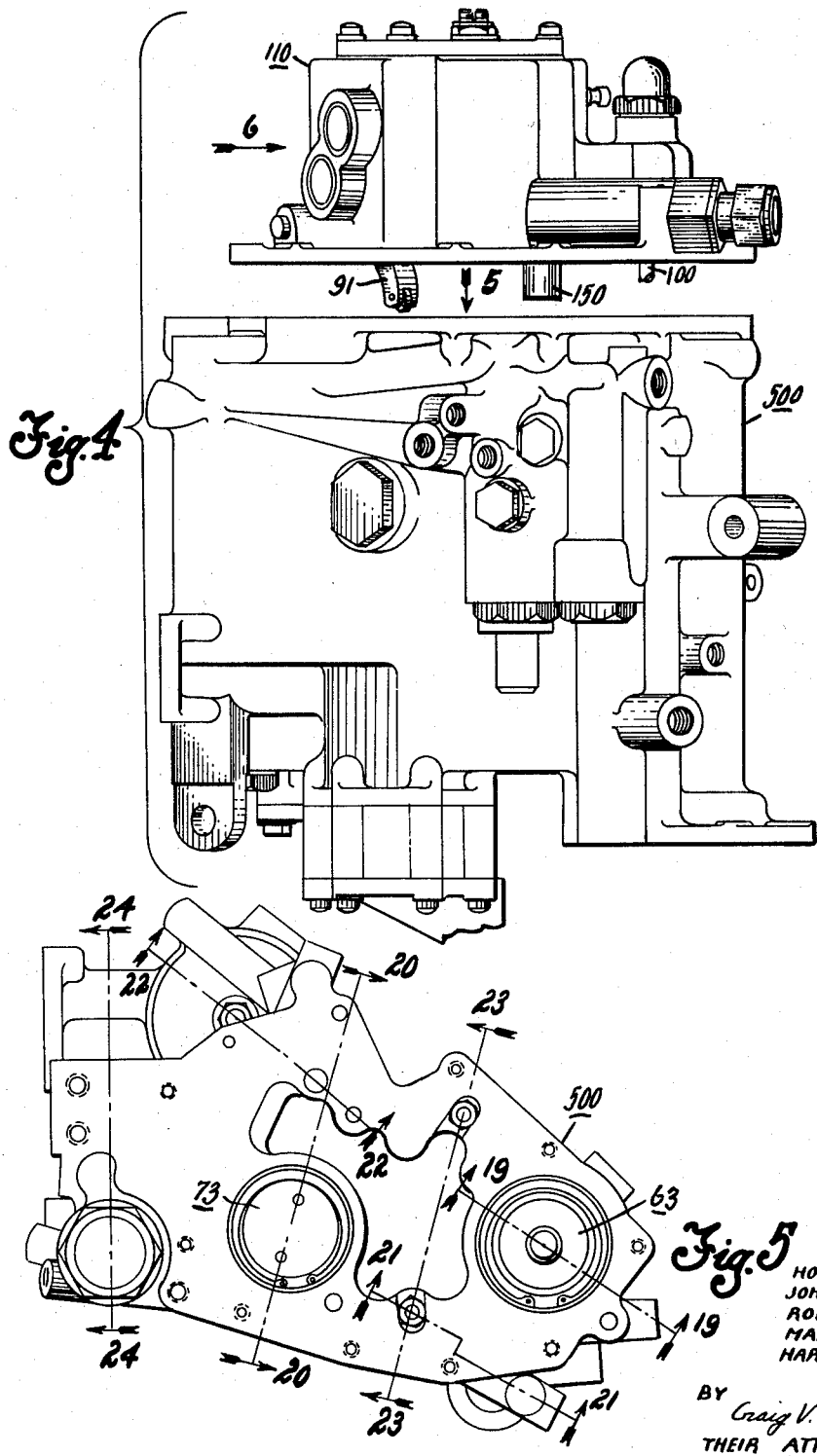

INVENTORS
HOWARD H. DIETRICH
JOHN D. HILLER
ROBERT LAY
MARK R. ROWE
HARRY C. ZEISLOFT

BY Craig V. Morton
THEIR ATTORNEY

INVENTORS
HOWARD H. DIETRICH
JOHN D. HILLER
ROBERT LAY
MARK R. ROWE
HARRY C. ZEISLOFT
BY Craig V. Morton
THEIR ATTORNEY

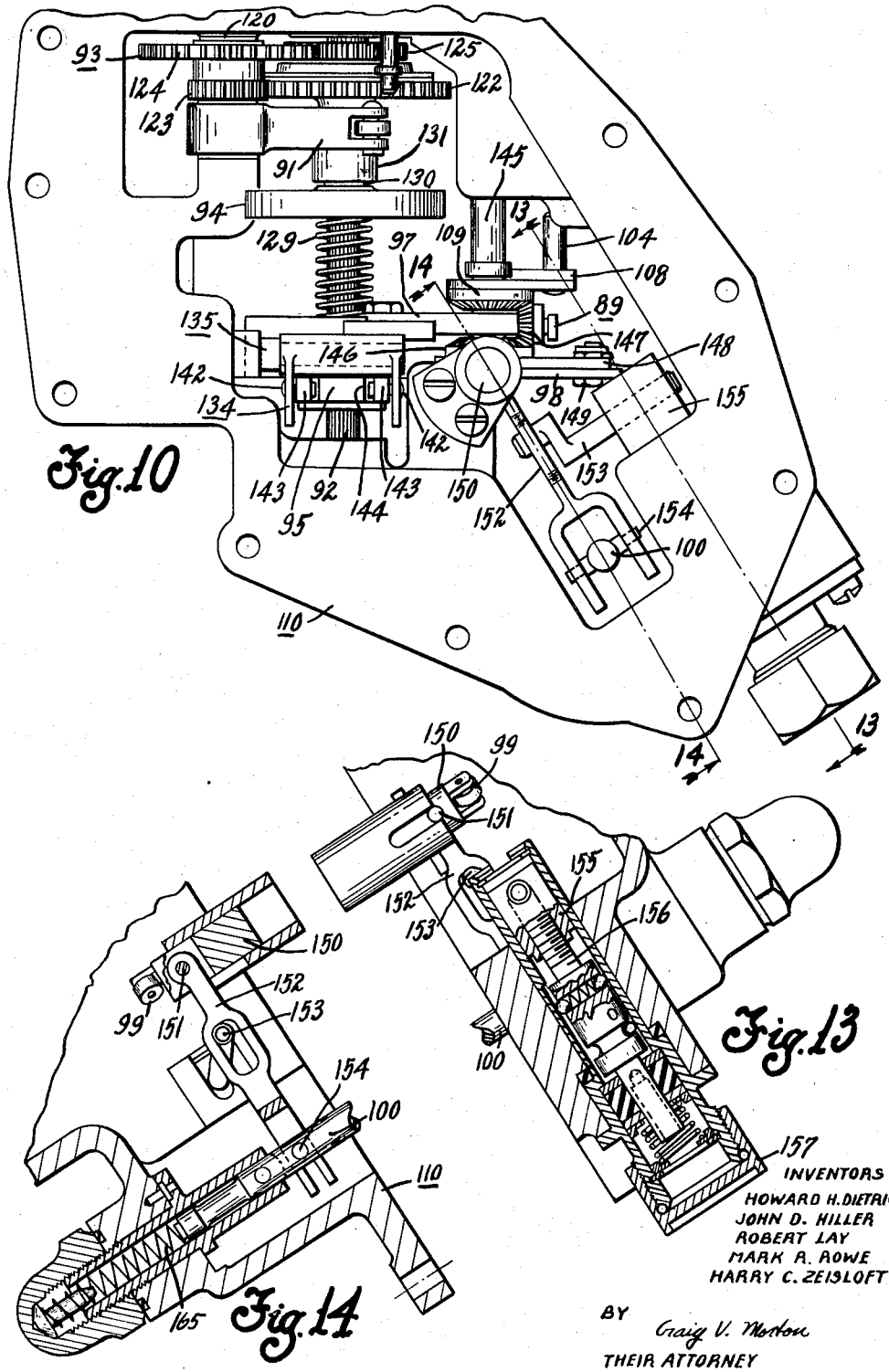

July 5, 1960 H. H. DIETRICH ET AL 2,943,441
AFTERBURNER FUEL SCHEDULING CONTROL WITH ENRICHMENT
AT LOW COMPRESSOR DISCHARGE PRESSURE
Filed April 1. 1955 14 Sheets-Sheet 7
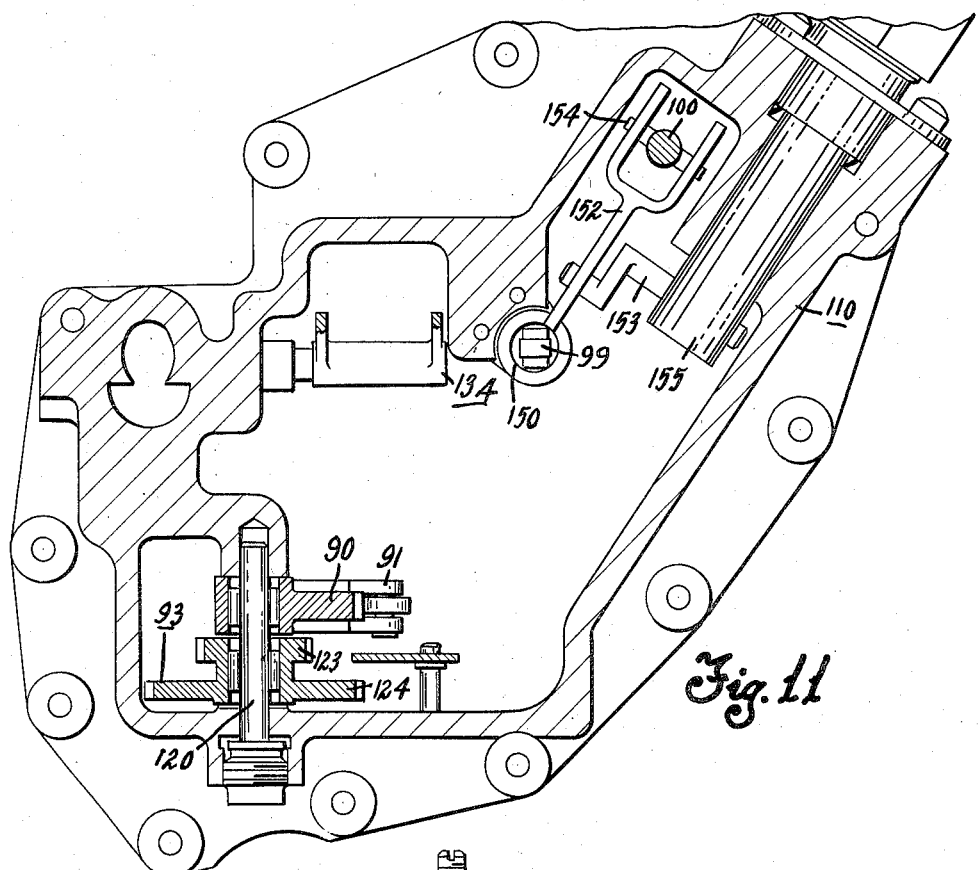
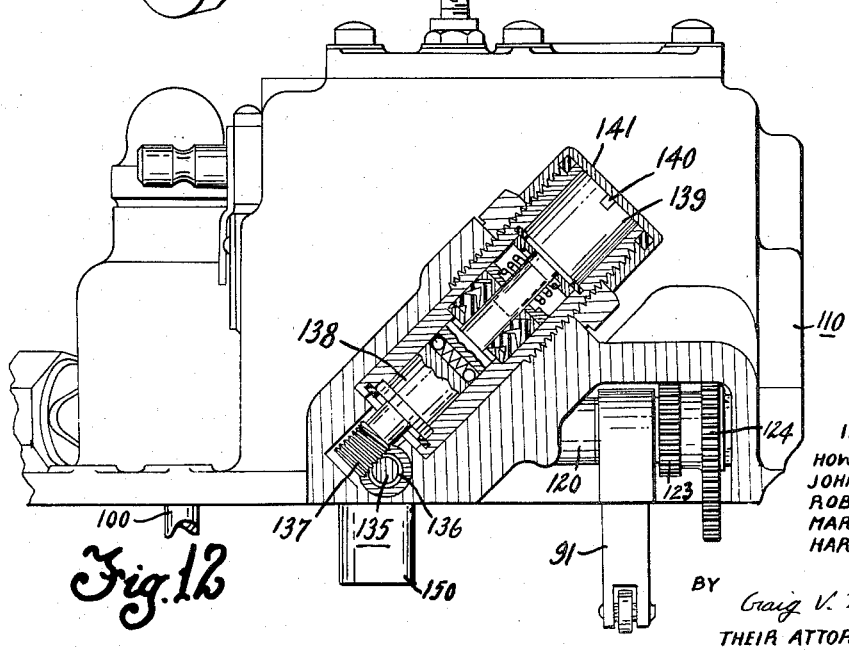
INVENTORS
HOWARD H. DIETRICH
JOHN D. HILLER
ROBERT LAY
MARK R. ROWE
HARRY C. ZEISLOFT
BY
THEIR ATTORNEY

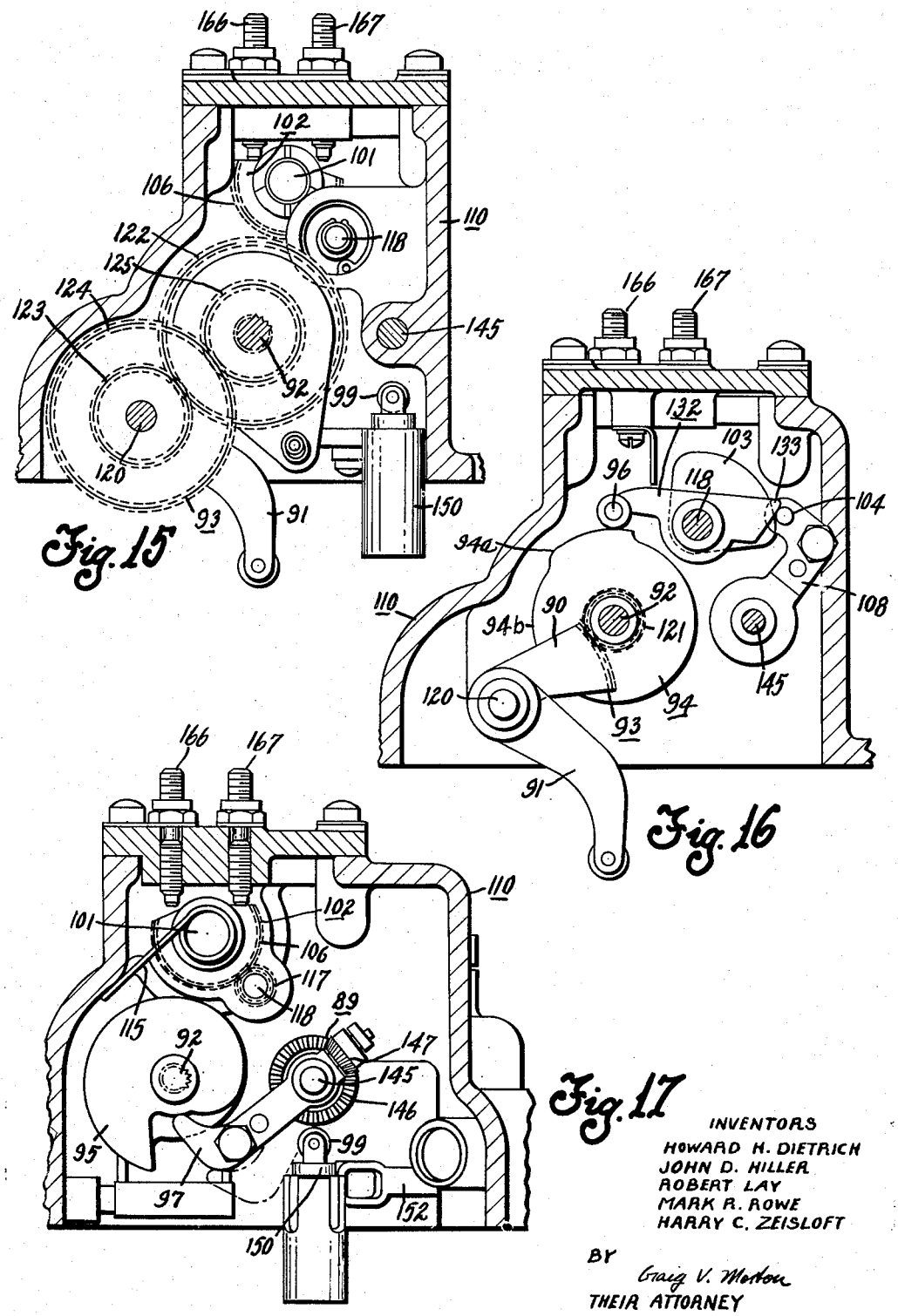

INVENTORS
HOWARD H. DIETRICH
JOHN D. HILLER
ROBERT LAY
MARK R. ROWE
HARRY C. ZEISLOFT

BY
Craig V. Morton
THEIR ATTORNEY

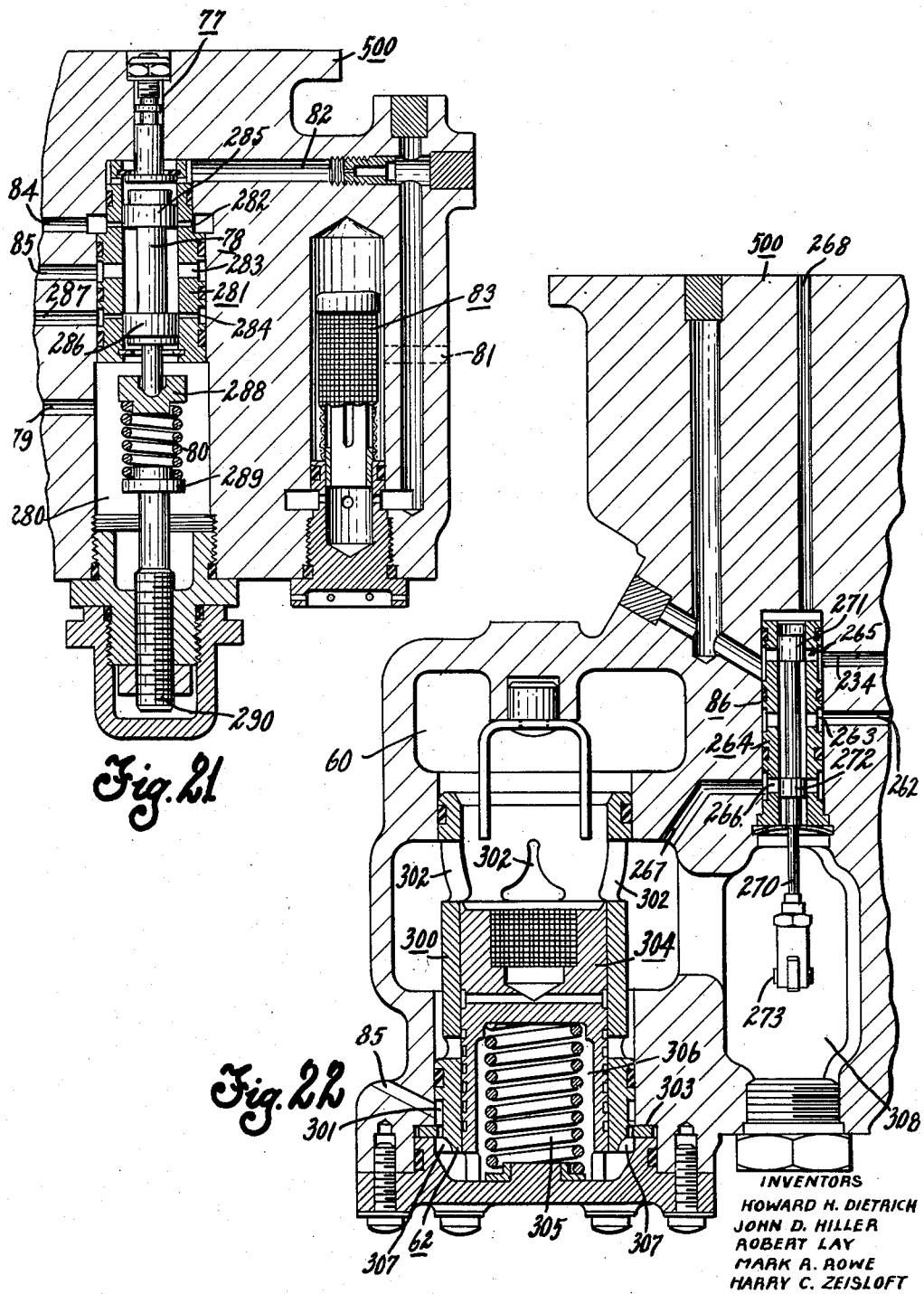

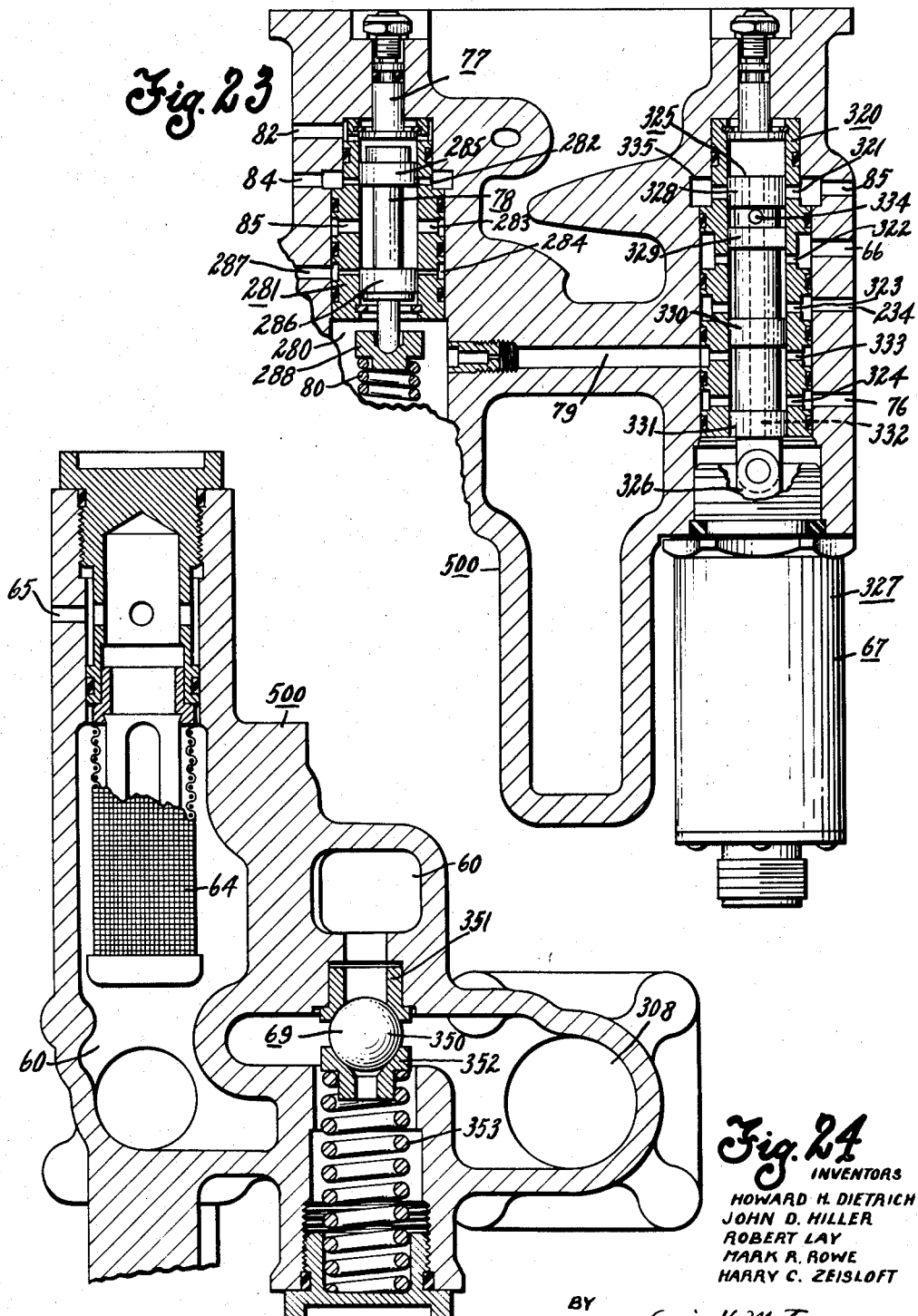

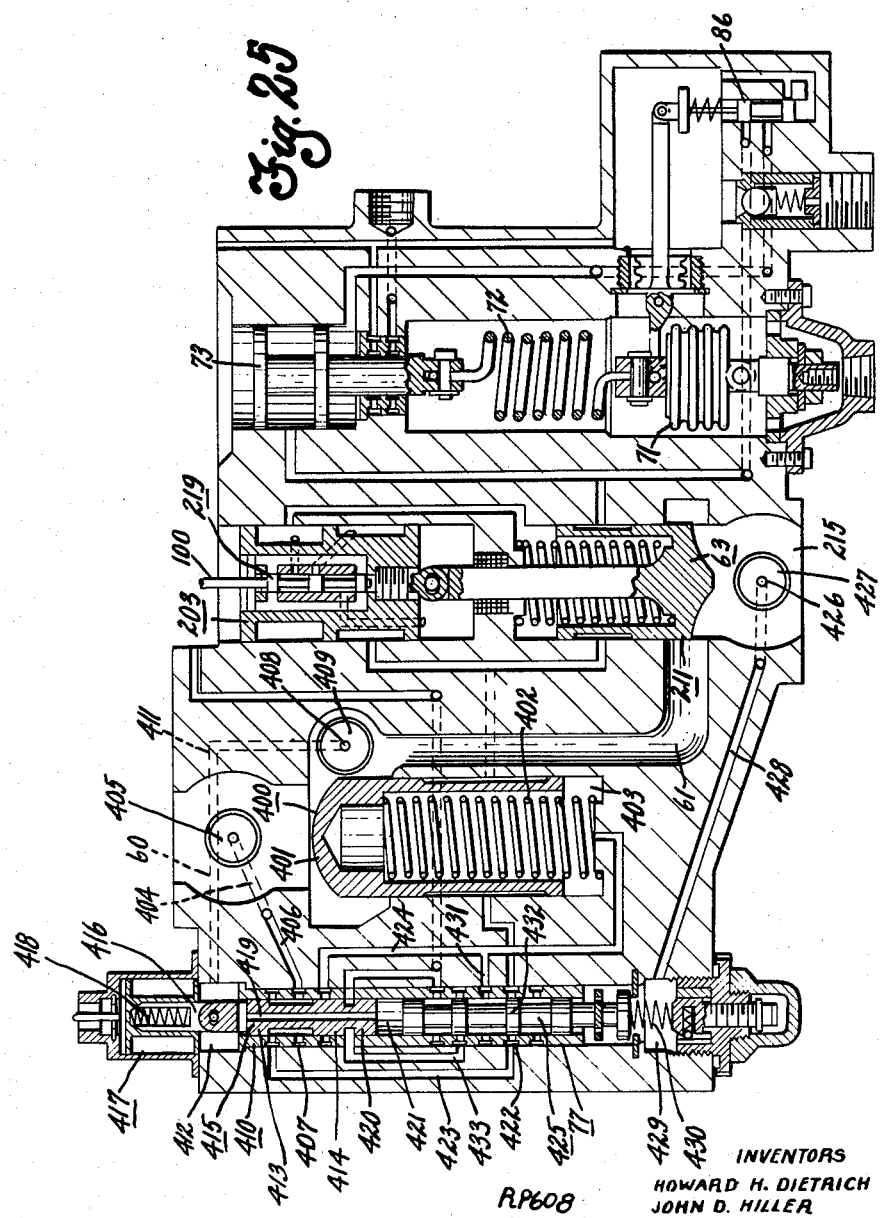

United States Patent Office 2,943,441
Patented July 5, 1960

2,943,441

AFTERBURNER FUEL SCHEDULING CONTROL WITH ENRICHMENT AT LOW COMPRESSOR DISCHARGE PRESSURE

Howard H. Dietrich, John D. Hiller, Robert Lay, Mark R. Rowe, and Harry C. Zeisloft, Rochester, N.Y., assignors to General Motors Corporation, Detroit, Mich., a corporation of Delaware Filed Apr. 1, 1955, Ser. No. 498,602

17 Claims. (Cl. 60—35.6)

This invention pertains to fuel controls, and particularly to a fuel control for the afterburner of a turbo jet engine.

It is well recognized that some automatically operable means must be utilized to control the fuel flow schedule to an afterburner under certain conditions. That is, while it is generally accepted that the fuel flow schedule may be controlled in accordance with compressor discharge pressure by means of a manual throttle lever, in order to prevent afterburner flame blowout and protect against engine surging it is desirable to incorporate some type of automatic fuel scheduling means to override the manual throttle lever setting when the compressor discharge pressure falls below a preselected value, indicative of either high altitude flying or low turbine speed. Furthermore, a transition point must be established at a second preselected value of compressor discharge pressure to initiate operation of the automatic override means and thereby establish the proper fuel flow schedule. The fuel controller of the present invention includes an automatic computer section and a servo actuated fuel flow section which is controlled by the computer. Accordingly, among our objects are the provision of an afterburner fuel control including means for scheduling fuel flow in accordance with compressor discharge pressure; the further provision of an afterburner fuel control including manually operable means for modulating the fuel flow schedule between predetermined limits above a preselected value of compressor discharge pressure; the further provision of an afterburner fuel control including automatically operable means for overriding the manual means and adjusting the fuel flow schedule back to 100% at a preselected critical value of compressor discharge pressure; the further provision of a computer responsive to compressor discharge pressure and manual throttle lever position; the further provision of a computer including sea level and altitude adjustment means; and the still further provision of a servo actuated fuel flow system controlled by the computer for scheduling fuel flow to an afterburner.

The aforementioned and other objects are accomplished in the present invention by the provision of means for scheduling fuel flow in accordance with compressor discharge pressure, means for modulating the aforesaid fuel flow schedule in accordance with throttle lever position, and means for overriding the throttle lever modulating means in a preselected range of compressor discharge pressure values to safeguard engine operation. Specifically, the fuel flow controller includes a computer section and a servo actuated fuel flow controlling section. Moreover, two types of the fuel flow controlling sections are disclosed herein, namely, a bypass type and a pressure throttling type.

The servo actuated fuel flow system includes a solenoid actuated shut-down valve. When this solenoid valve is deenergized, the fuel control is unarmed. Upon energization of the solenoid valve, the fuel control becomes armed for operation, the solenoid valve being actuated when the pilot's throttle lever is moved to a predetermined position. When the solenoid valve is open, high pressure fuel is applied to a piston which controls a fuel bypass valve, the bypass valve being under the control of a pressure regulator valve that maintains a constant pressure drop across the variable orifice of a metering valve through which fuel is supplied to the afterburner nozzles. The area of the metering valve orifice is controlled by compressor discharge pressure as modified by throttle lever position above a preselected value of compressor discharge pressure. As the metering valve opens, the fuel pressure supplied to the inlet thereof is automatically increased so as to maintain the predetermined pressure drop thereacross. Thus, as the metering valve opens, the outlet pressure approaches the inlet pressure, and the pressure regulating valve demands a greater inlet pressure which in the instant disclosure is achieved by imparting closing movement to the bypass valve. When the metering valve moves towards the closed position, the pressure differential thereacross increases so that the regulator valve and the bypass valve are actuated to reduce the inlet fuel pressure to the metering valve.

Compressor discharge pressure is sensed by a bellows, one end of which is fixed and the other end of which is connected to one end of a tension spring. The other end of the tension spring is connected to the rod of a pressure piston. The pressure responsive bellows controls a pilot valve, which, in turn, controls the application, or drain, of pressure fluid to the pressure piston whereby the position of the pressure piston is determined by compressor discharge pressure.

A follower, or lever, engages the pressure piston, the lever being connected to a sector gear through a step-up gear train to a shaft in the computer. A throttle reset cam and a three-dimensional compressor discharge pressure cam are connected to this shaft. A throttle reset cam follower is connected to an input ring gear of a differential gear set. A compressor discharge pressure cam follower is connected to a second input gear of the differential unit, and the output gear of the differential unit is connected through a fuel flow cam and follower to a metering valve actuating shaft. The throttle lever is connected through a lost motion device to a sector gear. When the throttle shaft is between a preselected position and wide open, the sector gear will be rotated thereby. The sector gear drivingly engages a shaft upon which a throttle cam is engaged by a follower interconnected with the throttle reset cam follower.

Movement of the output gear of the differential unit positions a fuel flow cam, the follower of which is connected to one end of a lever having an adjustable fulcrum. The other end of the lever is connected with a reciprocable plunger that engages a pilot valve associated with the metering valve. This pilot valve controls the application of pressure fluid to a sleeve piston that operates in a follow-up relation to the pilot valve, the sleeve piston being connected to the metering valve and positioning the same.

When the afterburner fuel control is armed, the pilot can manually modulate, or regulate, the fuel flow schedule to the afterburner nozzles between predetermined limits by moving the throttle lever between an afterburner start position and the wide open position. When the compressor discharge pressure is above a preselected value so that modulation of the fuel schedule will not result in engine surging, or after burner flame blowout, the pilot has full modulation control of the fuel flow scredule between the design limits of the controller. However, when the compressor discharge pressure is less than a second preselected value, indicative of high altitude flying, or low turbine speed, the compressor discharge pressure sensing means and the throttle reset mechanism will override the manual throttle lever setting and return the controller to the 100% schedule. When the compressor discharge pressure is between the first and second preselected values, the controller automatically modulates the fuel flow schedule irrespective of the manual throttle lever position to obtain the proper percentage schedule for the particular value of the compressor discharge pressure.

The computer section includes means for adjusting the fuel flow schedule for altitude and sea level. Thus, a sea level adjustment is incorporated for wide open throttle position which alters the slope of the fuel flow schedule about its zero value. The altitude adjustment regulates the slope of the fuel schedule about and below a predetermined value of compressor discharge pressure. The sea level adjustment is made to establish the 100% fuel flow line. The high altitude adjustment may then be made independently without affecting the 100% flow schedule above the predetermined value of compressor discharge pressure.

Further objects and advantages of the present invention will be apparent from the following description, reference being had to the accompanying drawings wherein preferred embodiments of the present invention are clearly shown.

In the drawings:

Fig. 3 is a composite schematic view of the fuel control, the computer being shown in exploded isometric, and the bypass type fuel flow system in section.

Fig. 4 is a composite plan view of the complete fuel control assembly.

Fig. 5 is a view in elevation taken in the direction of arrow 5 of Fig. 4.

Figure 6:
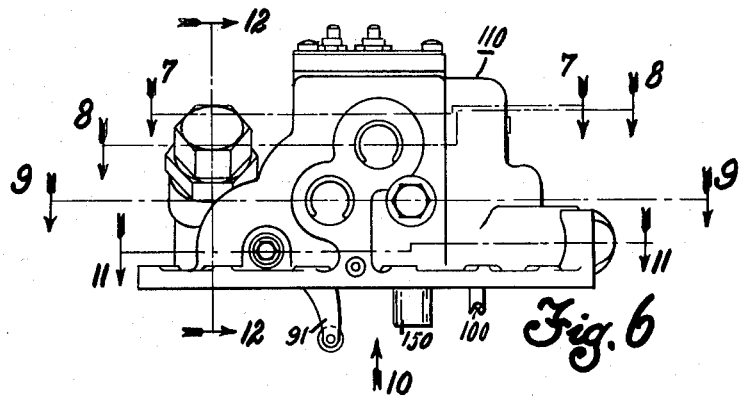
Fig. 6 is a view in elevation taken in the direction of arrow 6 of Fig. 4.
Figure 7:
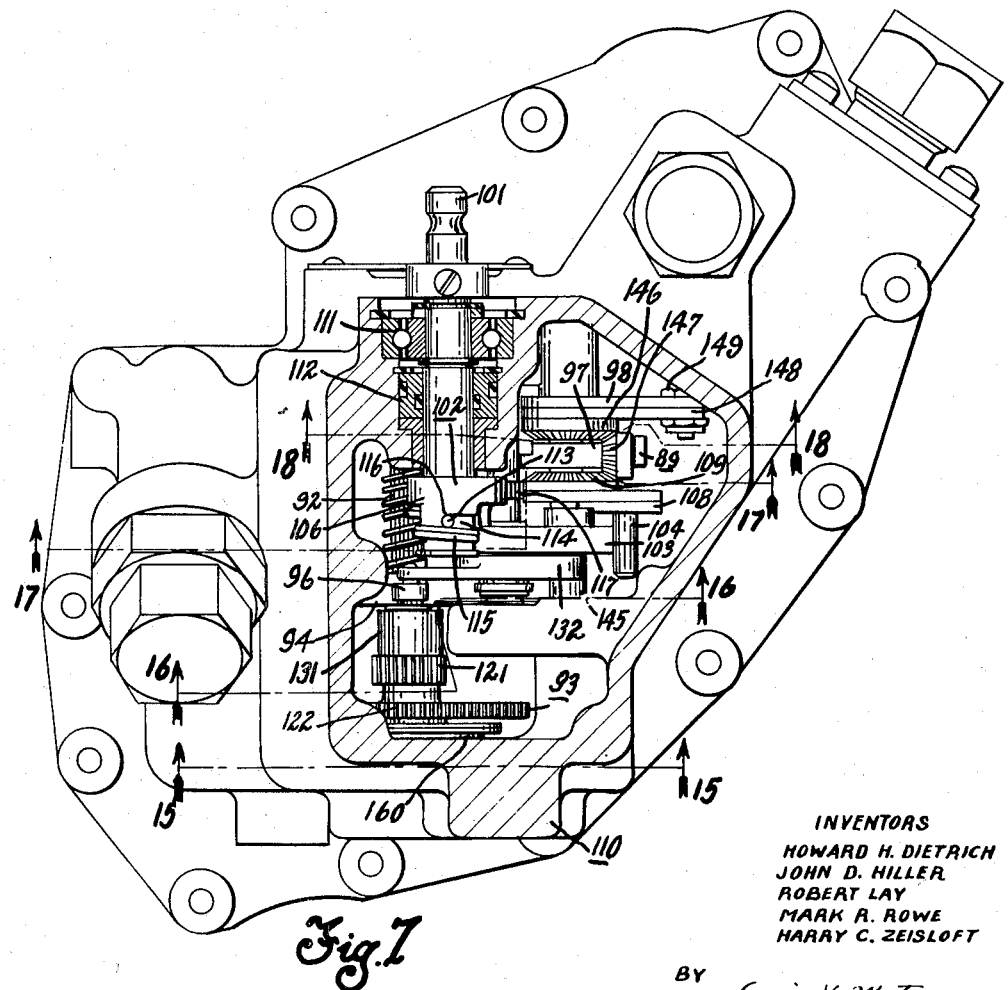
Figure 8:
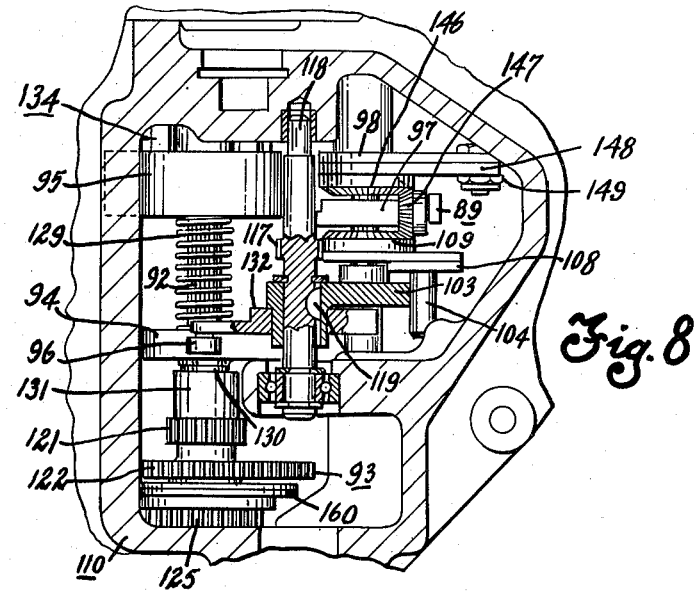
Figure 9:
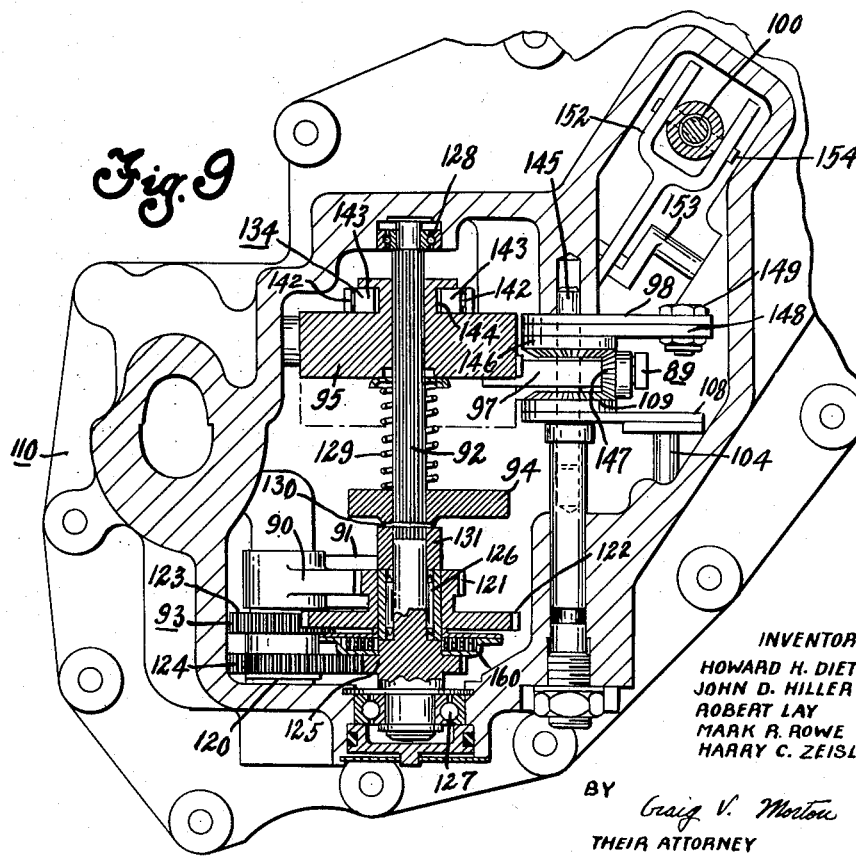

Figs. 7, 8 and 9 are enlarged sectional views taken along lines 7—7, 8—8 and 9—9, respectively, of Fig. 6.

Fig. 10 is an elevational view taken in the direction of arrow 10 of Fig. 6.

Figs. 11 and 12 are enlarged sectional views taken along lines 11—11 and 12—12, respectively, of Fig. 6.

Figs. 13 and 14 are fragmentary sectional views taken along lines 13—13 and 14—14, respectively, of Fig. 10.

Figs. 15 through 18 are sectional views taken along lines 15—15, 16—16, 17—17 and 18—18, respectively, of Fig. 7.

Figs. 19 through 24 are enlarged sectional views taken along lines 19—19, 20—20, 21—21, 22—22, 23—23 and 24—24, respectively, of Fig. 5.

Fig. 25 is a schematic sectional view of a pressure throttling type fuel flow system which may be controlled by the computer of this invention.

Figure 1:
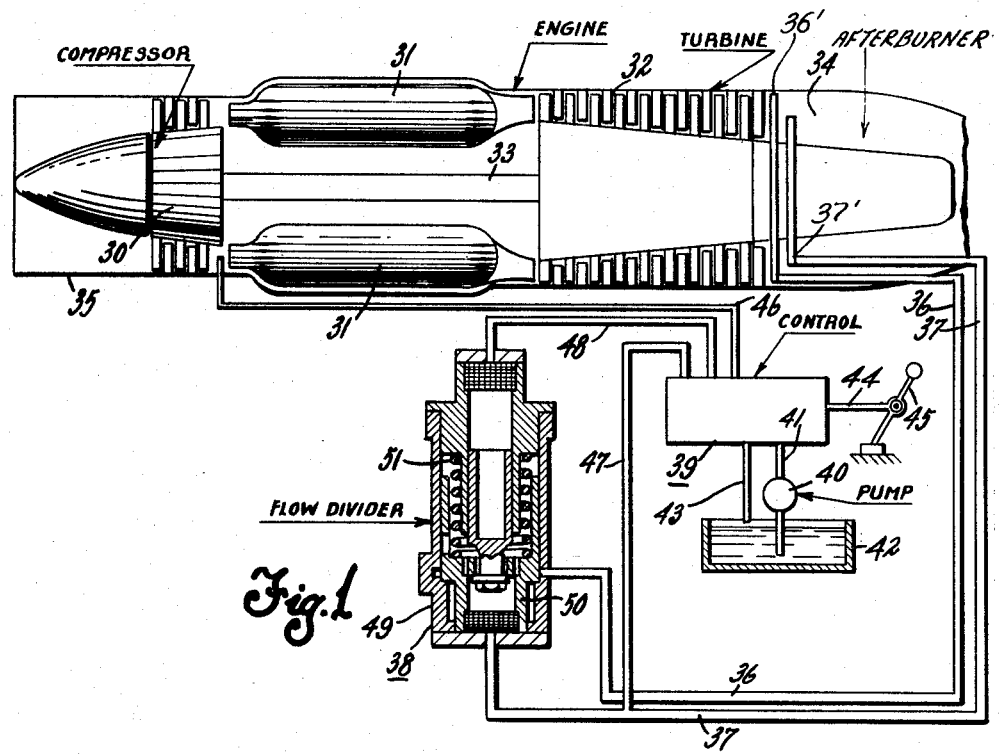
Fig. 1 is a diagrammatic view illustrating the afterburner fuel control of this invention in combination with a turbo jet engine.

With particular reference to Fig. 1, the fuel control of this invention is shown schematically in conjunction with a turbo jet engine including an axial flow compressor 30, a plurality of combustion chambers 31, an axial flow turbine 32, which is connected by means of a shaft 33 with the compressor 30, and an afterburner 34. The turbo jet engine is enclosed by a suitable housing 35. As shown, the afterburner includes a dual manifold discharge system and, thus, two fuel conduits 36 and 37 interconnect the afterburner fuel manifolds 36' and 37' and a flow divider valve assembly 38. The primary outlet conduit from the fuel control, which is generally designated by the numeral 39, is constituted by conduit 37 and a secondary outlet is constituted by conduit 36. The fuel control 39 is connected to the output of a fuel pump 40 by means of a conduit 41. The inlet of the fuel pump 40 communicates with a fuel reservoir 42. The fuel control 39 and the reservoir 42 are also interconnected by a drain conduit 43.

The fuel control 39 includes a computer section and a servo actuated fuel flow controlling section, as will be pointed out more particularly hereinafter. The computer section is connected through a rod 44 to a pilot's throttle lever 45. The fuel flow section is connected to a tube 46 through which the discharge pressure of the compressor 30 is sensed. In addition, the fuel flow section is connected by a conduit 47 with the conduit 37, and the flow divider valve assembly 38 is connected with the control through a leakage drain conduit 48.

The flow divider valve assembly 38 comprises a housing 49 within which a pressure responsive, spring opposed valve 50 is mounted for reciprocable movement. When the pressure in conduit 37 exceeds a predetermined value, as determined by the preload of spring 51, the plunger 50 will move upwardly and interconnect conduits 36 and 37. Any fuel which seeps by the valve plunger 50 will be returned to the reservoir 42 through conduit 48, the control 39 and conduit 43. It is to be understood that the flow divider assembly 38 can be employed with either a bypass type or a throttling type fuel flow section if the afterburner is of the type having a dual manifold discharge system.

With particular reference to Fig. 3, the general arrangement of the fuel control will be described. The output of the fuel pump 40 flows through conduit 41 and communicates with passages 60 and 61 of the fuel flow section depicted in Fig. 3, the fuel flow section of Fig. 3 being of the bypass type. Accordingly, the inlet passage 60 connects with a bypass valve assembly 62, the construction and function of which will be described more particularly hereinafter. Suffice it here to say that the bypass valve assembly 62 controls the pressure of fuel in passage 61, which is the inlet of a metering valve assembly 63. The construction of the metering valve assembly will, likewise, be described hereinafter, the function of the metering valve assembly being to control the flow of fuel to the afterburner. High pressure fuel from the passage 60 passes through filter 64 into a high pressure fuel passage 65 which has a branch 66 connected to a solenoid shut off valve 67 and a branch 68 connected with the metering valve 63. The fuel bypassed by the valve 62 flows back to the reservoir 42 through the conduit 43. The inlet passage 60 communicates with a pressure relief valve 69 of the spring loaded, ball type which is adjusted to limit the inlet pressure to a safe value.

Compressor discharge pressure in tube 46 communicates with a chamber 70 within which a Sylphon bellows 71 is disposed. The bellows is responsive to compressor discharge pressure, one end of the bellows being fixed and the other end of the bellows being connected to one end of a coil tension spring 72. As compressor discharge pressure increases, the bellows 71 tends to collapse, collapsing movement on the bellows being controlled by spring 72, the other end of spring 72 being connected to a piston 73, the position of which is indicative of compressor discharge pressure. Conversely, when compressor discharge pressure decreases, the bellows 71 expands.

The position of the compressor discharge piston 73 is controlled by a pilot valve 86, the pilot valve, in turn, being controlled by the pressure sensitive bellows 71 through a suitable linkage to be described more particularly hereinafter.

A portion of the fuel metered by valve 63 flows through passage 74 to a filter 75 and, thence, into passage 76, through the solenoid valve 67 and to a pressure regulator valve 77. The pressure regulator valve 77 is of the equal area type and includes a plunger 78. One end surface of the plunger 78 is exposed to metering valve outlet pressure through passages 74, 76 and 79. The plunger 78 is also urged upwardly by a preloaded spring 80. Upward movement of the plunger 78 is opposed by the pressure of fuel at the inlet of fuel passage 61 of the metering valve, which communicates with the pressure regulator valve 77 through passages 81, 82 and filter 83. The function of the pressure regulator valve 77 is to maintain a constant pressure differential between the inlet and outlet sides of the metering valve, say, for instance, 25 p.s.i., by controlling the position of the bypass valve 62 in a manner which will be described hereinafter. The pressure regulating valve 77 controls the bypass valve 62 inasmuch as it controls the flow of high pressure fuel from passage 84 to passage 85 which communicates with the under side of the bypass valve 62.

The solenoid shutoff valve allows fuel to flow to the afterburner when the pilot's control lever 45 is moved into the afterburning range. As indicated schematically on Fig. 3, the solenoid 327 of the valve is connected in a circuit with a current source 501 and a switch contact 502 engaged by the pilot's lever only in the afterburning range of movement.

The computer is controlled by the compressor discharge pressure piston 73 and the pilot's control lever 45, which is connected to a crank 88. The computer includes a mechanical gear type differential generally designated by the numeral 89 in Fig. 3. The piston 73 positions a sector gear 90 through a bellcrank arrangement 91. The sector gear 90 is drivingly connected with a straight splined shaft 92 through a step-up gear train generally designated by the numeral 93, as will be described more particularly hereinafter. A throttle reset cam 94 and a three-dimensional compressor discharge pressure cam 95 are rotatably connected with the shaft 92. A throttle reset cam follower 96 engages the cam 94 and a compressor discharge cam follower 97 engages the cam 95. The follower 96 is connected to one input gear of the differential 89 and the follower 97 is connected to a second input gear of the differential 89.

The output gear of the differential 89 is connected to a fuel flow cam 98 and thereby to a fuel flow cam follower 99 which moves a rod 100 that actuates the metering valve 63. The throttle lever crank 88 is connected to a shaft 101 and gearing 102 so as to position a throttle cam 103. The throttle cam 103 is engaged by a follower 104. The gear train 102 includes a sector gear 106 which is connected to the shaft 101 through a lost motion connection whereby movement is not imparted to the throttle cam 103 until the pilot's throttle lever is moved to a predetermined position. The afterburner fuel control is armed only when the solenoid valve 67 is energized, the solenoid valve 67 being automatically energized when the pilot lever 45 is moved to a predetermined position.

With particular reference to Figs. 4 through 6, the computer section of the fuel control is enclosed by a housing 110 and the fuel flow controlling section is enclosed by housing 500. The housings 110 and 500 are assembled in the fashion indicated in Fig. 4 whereby the bellcrank follower 91 and the rod 100 project into the housing 500. It is to be understood that the computer disposed within housing 110 can be used to control other types of fuel flow sections, such as a throttling type, as will be described hereinafter, and, thus, the computer section is arranged to be readily detachable from the fuel flow controlling section.

With particular reference to Figs. 6 through 18, the construction of the computer section will be described. The throttle lever crank 88 of Fig. 3 is connected to the shaft 101, which extends outwardly of the housing 110. The shaft 101 is rotatably journaled by a ball bearing assembly 111 and extends through a shaft seal assembly 112. The sector gear 106 is rotatably journaled on the shaft 101 and drivingly connected thereto through a lost motion connection including a pin 113 connected to the shaft 101 and disposed in a groove 114 of the sector gear 106. The sector gear 106 is normally biased by a torsion spring 115 to return to the start position. When the pilot's throttle lever is moved to a predetermined position, the pin 113 will engage the end 116 of slot 114 so as to impart rotation to the sector gear 106. The sector gear 106 meshes with a pinion gear 117, which, as seen in Fig. 8, is integral with a shaft 118. The throttle cam 103 is keyed to the shaft 118 at 119, and, as shown in Figs. 8 and 16, is engaged by follower 104. Follower 104 comprises a pin which is connected to a throttle input arm 108 of the mechanical differential 89, as shown in Figs. 7, 8 and 16. The arm 108 is connected to input gear 109 (Fig. 9) of the differential 89.

With particular reference to Figs. 9, 10 and 16, the pressure piston follower 91 is shown connected to the sector gear 90, the sector gear 90 being rotatably supported on a shaft 120. The sector gear constitutes part of the gear train 93, which includes a spur gear 121 that meshes with the sector gear 90, the spur gear 121 being integral with a larger diameter spur gear 122 that meshes with a smaller diameter spur gear 123, likewise rotatably journaled on shaft 120; and the spur gear 123 is integral with a larger diameter spur gear 124, which meshes with a spur gear 125. The spur gear 125 is integral with the splined shaft 92. The gear assembly 121 and 122 are rotatably journaled on the shaft 92 by a needle bearing assembly 126, the shaft 92 having its opposite ends journaled by ball bearing assemblies 127 and 128.

The throttle reset cam 94 is maintained in spaced relation with respect to the compressor discharge pressure cam 95 by a spring 129. The spring 129 urges the throttle reset cam 94 into engagement with a washer 130, which abuts a collar 131.

With particular reference to Fig. 16, it may be seen that the throttle reset cam 94 is engaged by the follower 96, which is carried by a lever 132 having intermediate pivotal support on the shaft 118. The end 133 of the follower lever 132 is arranged to engage throttle cam follower pin 104 so as to override the throttle cam 103 under certain operating conditions of the turbo jet engine, which will be pointed out more particularly hereinafter. Suffice it here to say that the input gear 109 moved by follower 104 of the differential 89 may be controlled by either the throttle cam 103 or the throttle reset cam 94.

The compressor discharge pressure cam 95 is of the three-dimensional type, as particularly shown in Fig. 3. The base circle of the cam 95 may be varied by adjusting the position thereof longitudinally relative to the shaft 92 and to the follower 97, as shown in Fig. 17. The cam 95 may be positioned between the full and dotted line positions, as indicated in Fig. 9. This adjustment is effected through a yoke 134, which is connected to a shaft 135 (Figs. 12 and 18) having a toothed portion 136 in engagement with a worm 137. By rotating the worm 137, the cam 95 can be shifted axially relative to the shaft 92 so as to vary the base circle of the compressor discharge pressure cam. The effect of this adjustment on the fuel flow schedule will be discussed hereinafter. The worm 137 and shaft 135 are shown structurally in Fig. 12, and it may be seen that the worm 137 is integral with a shaft 138. The shaft 138 is coupled to a driver 139 having a screwdriver slot 140 therein. After the altitude adjustment has been accomplished, the driver 139 is enclosed by a cap, or cover, 141. The ends of the yoke 134 have connected thereto pins 142, which are embraced by sleeves 143 that ride in an annular groove 144 formed in the cam 95.

With particular reference to Fig. 17, the compressor discharge pressure cam follower 97 has intermediate pivotal support on a shaft 145 about which input differential gear 109 and output differential gear 146 are rotatably journaled. The other end of the follower 97 carries a bevel type pinion gear 147 constituting a second input for the differential unit 89. Thus, the output differential gear 146 may be positioned through gear 147 by the follower 97 of the compressor discharge pressure cam 95 alone, or by the throttle lever input gear 109, or conjointly.

Figure 18:
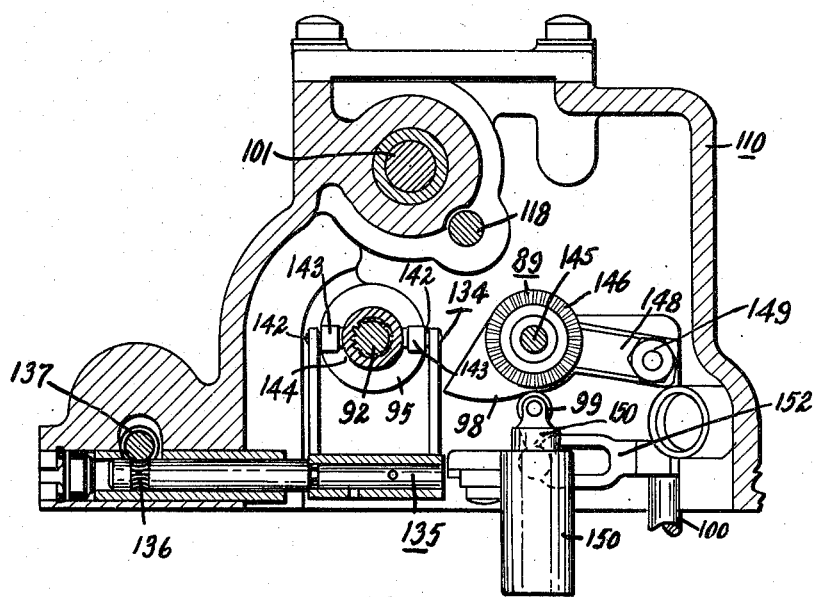

The output gear 146 of the differential unit 89 is connected to a crank arm 148, as shown in Figs. 3, and 7 through 9. The crank arm 148 is in turn, connected by means of a nut and bolt assembly 149 to the fuel flow cam 98, as seen in Figs. 3 and 18. The fuel flow cam 98 is rotatably journaled about the differential unit shaft 145 and is engaged by the follower 99. The follower 99 is carried by a slidable plunger 150 which is pinned at 151 (Figs. 13 and 14) to one end of a lever 152 having intermediate adjustable fulcrum 153. The other end of the lever 152 is bifurcated to form a yoke, which is connected by a cross pin 154 to the rod or plunger 100 which controls the metering valve. The intermediate fulcrum 153 comprises an adjustable crank arm, which, as seen in Figs. 9, 13 and 14, is received in a bifurcated end of a longitudinally adjustable plunger 155.

As seen in Fig. 13, the plunger 155 constitutes a nut which engages a screw 156, which is externally adjustable. By rotating the screw 156, which constitutes the sea level adjustment, the fulcrum or pivot pin position may be adjusted to alter the fuel flow schedule, as will be pointed out more particularly hereinafter. After adjustment of the screw 156, it is sealed by a cap 157.

In order to eliminate backlash in the gear train 93, a torsion spring assembly 160 (Fig. 9) is incorporated therein. The torsion spring assembly 160 operates in a conventional manner to maintain the engaged teeth of the several gears in abutment so as to assure accurate positioning of the shaft 92 and the cams carried thereby. The rod 100 is loaded by a spring 165 to assure precise transmission of movement between the fuel flow cam and the rod.

The sector gear 106 is only adapted for limited angular movement, as permitted by adjustment screw stops 166 and 167, as indicated in Fig. 17. The torsion spring 115 normally maintains the sector gear 106 in engagement with the stop 167. One end of the torsion spring 115 is connected to the sector gear 106 and the other end bears against the housing 110, as indicated in Fig. 17.

With particular reference to Figs. 4, 5 and 19 through 24, the physical embodiment of the bypass type fuel flow section will be described. As seen in Fig. 5, the bellcrank follower 91 projects into an opening in the housing 500 and engages the upper surface of the compressor discharge pressure piston 73. The rod 100 projects through an opening in the housing 500 and actuates the metering valve 63 in a manner to be described.

Figure 19:
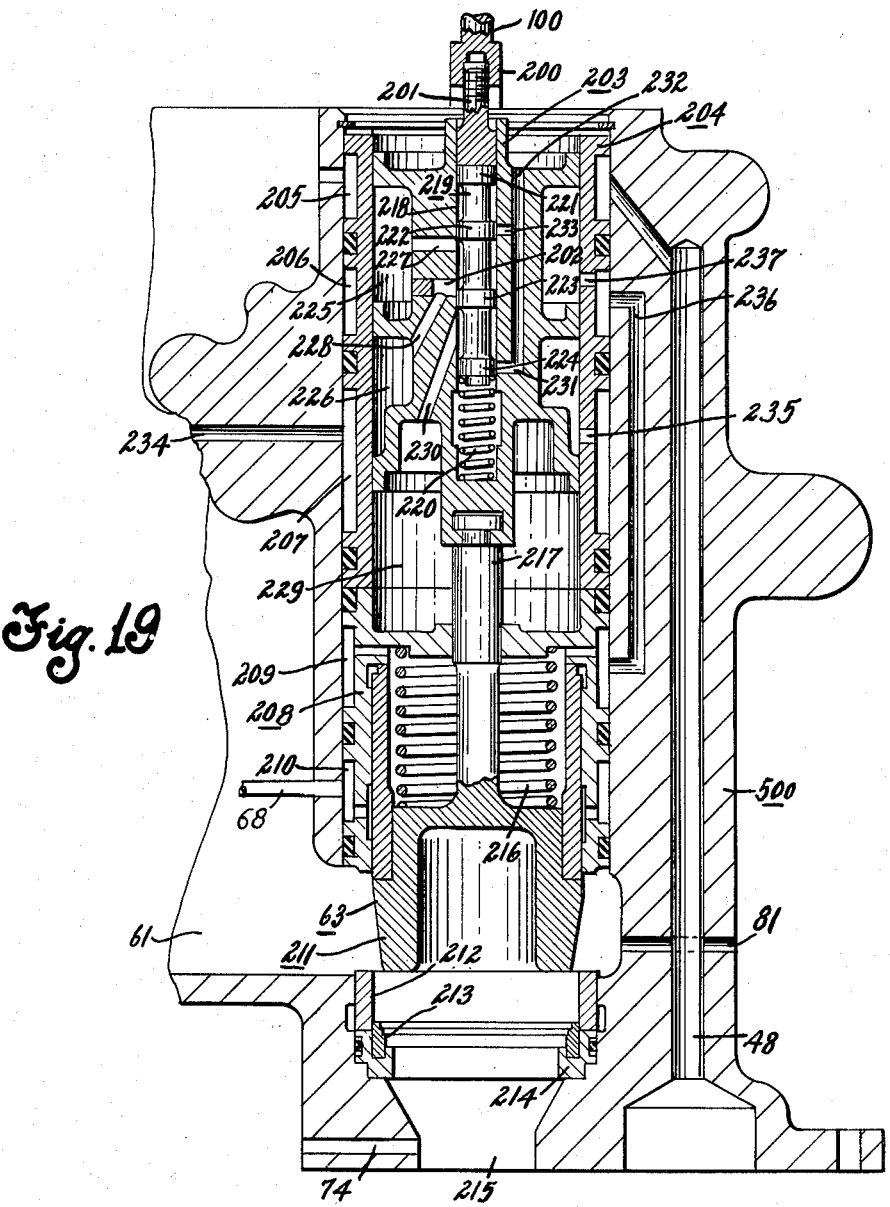

With particular reference to Fig. 19, the construction of the metering valve 63 and the actuating means therefore are depicted. The rod 100, which comprises the output of the computer section engages a nut 200, which is carried by a stud 201. The stud 201 is slidably received in a reciprocable sleeve piston 203 disposed within a stationary sleeve cylinder 204. The stationary sleeve 204, carried by the housing 500, is formed with a plurality of axially spaced annular grooves 205, 206 and 207. The lower end of the sleeve 204 abuts a second stationary sleeve 208 having a pair of annular grooves 209 and 210. A reciprocable metering valve element 211 having a conical head is supported for reciprocable movement within the stationary sleeve 208. The valve element 211 is shown in the wide open position in Fig. 19 and in the closed position in Fig. 3, wherein the valve element 211 engages an annular valve seat 212 having a ring 213 with a series of annular steps which constitute sealing surfaces. The ring 213 is carried in an annular groove of a supporting annulus 214, which is coaxial with the outlet passage 215 connected to line 47.

The inlet fuel passage 61 is clearly shown in Fig. 19, as well as the outlet pressure passage 74. The metering valve element 211 is biased downwardly by a compression spring 216, opposite ends of which engage metering valve element 211 and the upper end of the sleeve 208. The spring 216 is coaxially disposed relative to a rod 217 integral with the valve element 211, the rod 217 being connected to the sleeve piston 203.

The sleeve piston 203 is formed with a central bore 218 within which a reciprocable pilot valve plunger 219 is disposed. The plunger 219 is urged upwardly by a spring 220. The plunger 219 has spaced lands 221, 222, 223 and 224. The sleeve piston 203 is formed with a pair of axially spaced annular grooves 225 and 226. Annular groove 225 communicates with the bore 218 by means of passage 227. Annular groove 226 communicates with the bore 218 by means of passage 228 and port 202. A chamber 229 between the lower end of sleeve piston 203 and the sleeve 208 communicates with the bore 218 by means of passage 230. Plunger land 224 controls a port 231, which is connected to a passage 232, plunger land 222 controls a port 233, which is, likewise, connected to the passage 232, and land 223 controls port 202.

Annular groove 207 communicates with housing passage 234, passage 234 connecting with supply branch passage 66 through the solenoid shut-off valve 67. Thus, high pressure fuel is admitted to the bore 218 through passage 235, the annular groove 226, the passage 228 and port 202 to the space between lands 222 and 223. Annular groove 206 of the sleeve 204 is connected by a passage 236 with annular groove 209 of sleeve 208. Any high pressure fuel which seeps by the metering valve element 211 will flow through passage 236 to annular groove 206 from which it may flow to annular groove 225 through passage 237. This high pressure fuel also communicates with the bore 218 through passage 227. Upward movement of the sleeve piston 203 and, hence, the bypass valve element 211 is effected by pressurizing chamber 229 so as to compress spring 216. Conversely, downward movement of the sleeve piston 203 and the valve element 211 is effected by reducing the pressure in chamber 229, thereby permitting spring 216 to expand.

In order to increase the fuel flow through the valve port constituted by rings 212, 213 and 214 to the outlet passage 215 from the inlet 61, the valve element 211 and the sleeve piston 203 must move upwardly, as viewed in Figs. 3 and 19. To effect this upward movement, the pressure in chamber 229 must be increased by effecting relative movement between the sleeve piston 203 and the plunger 219 so as to interconnect passage 230 with passage 228.

The output rod 100 of the computer abuts the nut 200 and the stud 201 abuts the plunger 219. The spring 220 maintains the plunger 219 in engagement with the stud 201 and the nut 200 in engagement with the rod 100. In order to impart upward movement to the sleeve piston 203, as viewed in Fig. 3, so as to interconnect the inlet 61 with the outlet 215, the rod 100 moves upwardly and the spring 220 imparts a like upward movement to the plunger 219. Thus, high pressure fuel from groove 226 flows through passage 228, through port 202, through passage 230 to the chamber 229 whereupon the sleeve piston 203 will follow-up the movement of the plunger 219. Inasmuch as the sleeve piston 203 is rigidly connected to the valve element 211, the valve element 211 will move upwardly, thereby compressing spring 216 and interconnecting inlet passage 61 with outlet passage 215 through the metering valve port constituted by rings 212, 213 and 214.

Conversely, to decrease the flow of fuel to the outlet passage 215, the rod 100 is moved downwardly, thereby imparting downward movement to the plunger 219, as viewed in Fig. 19. Thus, the chamber 229 will be connected to drain through passage 230, port 231 and passage 232 so that the sleeve piston 203 will follow-up the movement of the pilot valve plunger 219 under the control of spring 216. In this manner, the flow of fuel from inlet passage 61 to outlet passage 215 will be metered.

Figure 20:
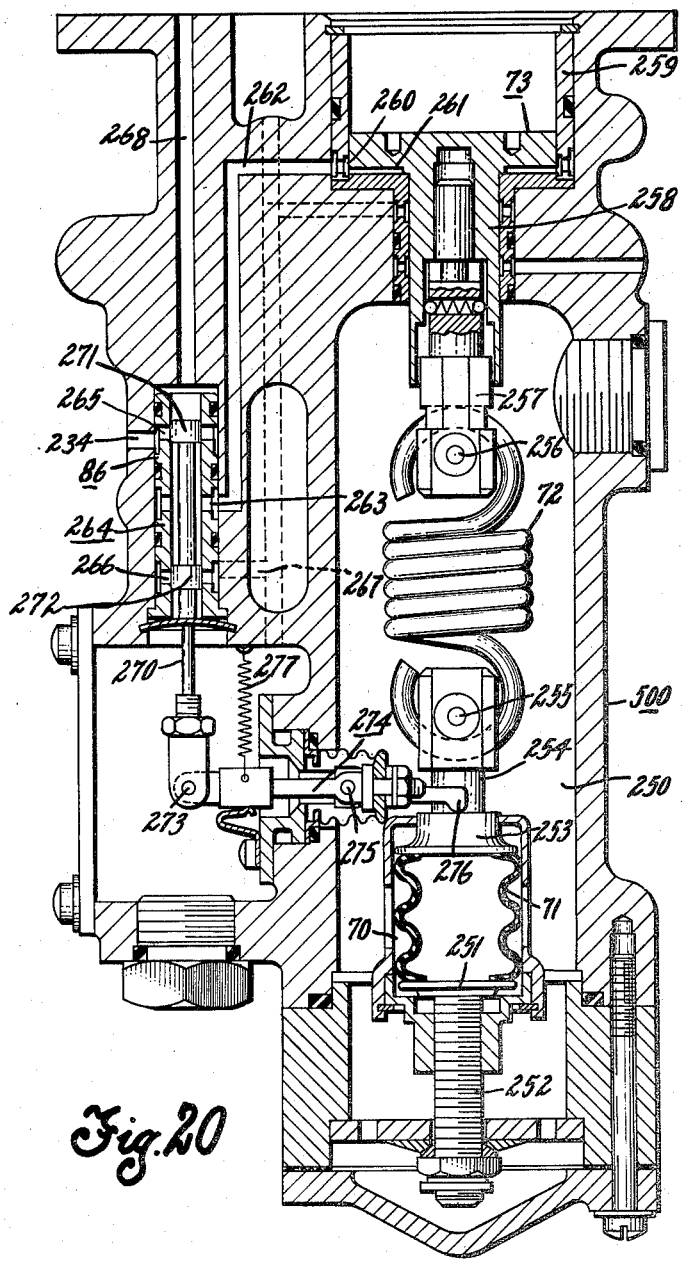

With reference to Fig. 20, the physical embodiment of the pressure responsive bellows 71 and the compressor discharge pressure piston 73 will be described. The housing 500 includes a chamber 250, which is subjected to the discharge pressure of the compressor. One end of the bellows 71 is attached to a seat 251 carried by a bolt 252, which is fixedly attached to the housing 500. The other end of the bellows 71 is connected to a cap member 253 forming part of a trunnion 254 having a pin 255 about which one end of the compression spring 72 is hooked. The other end of the compression spring 72 is hooked around a pin 256 carried by a trunnion 257, which is suitably connected to the rod 258 of the piston 73. The piston 73 is slidably supported in a cylinder liner 259, the cylinder liner having a port 260, which communicates with a chamber 261 exposed to the rod end surface of the piston.

The port 260 is connected to a passage 262, which connects with a port 263 of a sleeve 264 forming part of the pilot valve 86. The sleeve 264 is also formed with spaced ports 265 and 266. Port 265 is connected with passage 234 and, hence, the high pressure fuel supply. Port 266 is connected to passage 267, which is a drain passage. In addition, the upper end of the sleeve is connected to a passage 268, which constitutes another drain passage.

A reciprocable plunger 270 is disposed within the sleeve 264, the plunger having a pair of spaced lands 271 and 272, which control ports 265 and 266, respectively. The plunger 270 is connected by means of a pin 273 to a lever 274 having an intermediate pivot point 275. The other end of lever 274 is formed as a follower 276 and engages the upper surface of cap 253. Thus, as the discharge pressure of the compressor varies, the bellows 71 will either contract or expand, thereby imparting pivotal movement to the lever 274.

When compressor discharge pressure increases, the bellows 71 tend to collapse whereupon lever 274 will move in a clockwise direction, as viewed in Fig. 20, under the influence of spring 277. Thus, the plunger 270 will move upwardly so as to interconnect port 265 with port 263. Accordingly, high pressure fuel from passage 234 will flow through passage 262 and port 260 to chamber 261, thereby imparting upward movement to the piston 73. When the piston 73 moves upwardly, the spring 72 will tend to restore the bellows 71 to its original position so as to restore plunger 270 to a neutral position whereupon the flow of high pressure fuel to chamber 261 will be discontined. Thus, for each and every value of compressor discharge pressure, the piston 73 will assume a different position within the sleeve cylinder 259.

Conversely, when compressor discharge pressure decreases, the bellows 71 will expand, thereby imparting counterclockwise movement to the lever 274. Accordingly, the plunger 270 will be moved downwardly, thereby interconnecting ports 263 and 266. Thus, the chamber 261 will be connected to drain through port 260, passage 262, ports 263 and 266, and passage 267. The spring 72 will move the piston 73 downwardly, thereby restoring the bellows 71 to its original position and returning the plunger 270 to a neutral position.

With particular reference to Fig. 21, the structural embodiment of the regulator valve 77 will be described. The regulator valve 77 is disposed within a bore 280 of the housing 500, and includes a fixed sleeve 281 having open ends and axially spaced ports 282, 283 and 284. The equal area plunger 78 has a pair of spaced lands 285 and 286 cooperating with ports 282 and 284, respectively. The upper end of the plunger 78 is exposed to fuel pressure from passage 82, which connects with the outlet of filter 83, the inlet of filter 83 being connected to passage 81, which communicates with the inlet passage 61 of the metering valve, as depicted in Fig. 19. Port 282 of the sleeve 281 connects with passage 84 and the passage 234. Port 283 of the sleeve 281 connects with passage 85. Port 284 of the sleeve 281 connects with a drain passage 287. The lower end of plunger 78 is connected to a spring seat 288 and is exposed to pressure in the chamber 280 from passage 79, which is the pressure at the outlet passage 215 of the metering valve. The plunger 78 is biased upwardly by a preloaded spring 80, the lower end of spring 80 engaging an adjustable spring seat 289 having a stud portion 290 threaded into the housing 500. The spring 80 is preloaded to maintain a predetermined pressure differential, for instance, 25 p.s.i., between the pressure of the fuel at passage 215 and the pressure of fuel at passage 61. The pressure drop across the metering valve is maintained substantially constant by controlling the pressure at the inlet through operation of the bypass valve 62.

With reference to Fig. 22, the physical embodiment of the bypass valve 62 and its mode of operation will be described. The passage 85 communicates with an annular groove 301 in a porting sleeve 300 of the bypass valve 62. The porting sleeve 300 is formed with a plurality of substantially triangular ports 302, and is fixedly supported within the housing 500 by means of a radially extending shoulder 303. A reciprocable bypass valve element 304 is slidably supported within the porting sleeve 300, the element 304 being urged upwardly by a spring 305 disposed within a chamber 306. The chamber 306 communicates with the annular groove 301 through a plurality of openings 307 in the radial shoulder 303 of the sleeve 300. Inlet fuel in chamber 60 acts on the upper surface of the valve element 304 and tends to move it downwardly so as to open ports 302 and bypass fuel to chamber 308. The spring 305 opposes downward movement of the valve element 304 and tends to close the ports 302. Downward movement of the valve element 304 is also opposed by the pressure in chamber 306 from passage 85, which communicates with the outlet port 283 of the pressure regulator valve 77. Thus, when the pressure drop across the metering valve 63 is less than the predetermined pressure drop (the preload of spring 80), the plunger 78 of valve 77 will move upwardly, thereby supplying high pressure fuel from passage 84 to passage 85 and the chamber 306. Thus, the pressure of fuel in chamber 306 and the spring 305 will move the valve element 304 upwardly so as to decrease the bypass area of ports 302, thereby increasing the pressure of fuel in the inlet passage 61 of the metering valve and restoring the pressure drop across the metering valve to the predetermined selected value.

Conversely, if the pressure drop across the metering valve 63 is greater than the predetermined pressure drop, the plunger 78 of valve 77 will move downwardly, since the pressure acting on the upper surface thereof will be greater than the combined force of the pressure acting on the lower surface and the spring 80. Hence chamber 306 and passage 85 will be connected to drain through port 284 and passage 287 whereupon the pressure of the inlet fuel in passage 60 will move the bypass valve element downwardly so as to increase the area of ports 302, thereby diminishing the pressure of fuel at the inlet passage 61 at the bypass valve.

With particular reference to Fig. 23, the physical embodiment of the solenoid shut-down valve 67 will be described. The solenoid shut-down valve includes a fixed sleeve 320 having a plurality of axially spaced ports 321, 322, 323, 333 and 324. A reciprocable plunger 325 is slidably disposed within the sleeve 320, one end of the plunger being connected to the armature 326 of the solenoid 327. When the solenoid 327 is de-energized, the plunger 325 is moved upwardly by suitable resilient means, not shown, and when the solenoid 327 is energized, the plunger 325 assumes the position depicted in Figs. 3 and 23.

The plunger 325 includes a plurality of axially spaced lands 328, 329, 330 and 331 and is formed with a central bore 332. Land 328 controls ports 321, land 329 controls ports 322, land 330 controls ports 323 and 333, and land 331 controls ports 324. The annular groove between lands 328 and 329 is connected through the central bore 332 through a radial passage 334.

When the fuel control is armed, the solenoid 327 is energized so as to position the plunger 325 in the position depicted in Figs. 3 and 23. Thus, passage 85 is uninterrupted as land 328 blocks ports 321 and the annular groove 335 around the sleeve 320 interconnects the branches of passage 85. In addition, passage 66 is connected through ports 322 and the annular groove between lands 329 and 330 to ports 333 and, thence, to passage 234. Furthermore, passage 79 is interconnected with passage 76 through ports 333, 324 and the annular groove between lands 330 and 331.

However, when the solenoid 327 is deenergized and the plunger 325 is moved upwardly, it will be appreciated that passage 85 will be connected to drain through passages 334 and 332, passage 66 will not communicate with passage 234, and passage 76 will not communicate with passage 79. Thus, when the fuel control is unarmed by reason of the solenoid valve being deenergized, no movement can be imparted to the metering valve and, hence, the spring 216 will cause the metering valve element 211 to engage its seat constituted by rings 212, 213 and 214. Hence, no fuel will be supplied to the afterburner.

With reference to Fig. 24, the physical embodiment of the pressure relief valve 69 is depicted. The pressure relief valve 69 comprises a ball 350 adapted to engage a seat 351 and exposed to the pressure of fuel at the inlet 60. The ball is supported by a second seat 352 and urged into engagement with seat 351 by a spring 353. When the pressure at the inlet passage 60 exceeds a predetermined value as determined by the load of spring 353, the ball 350 will move downwardly, thereby interconnecting inlet passage 60 with bypass chamber 308.

Figure 2:
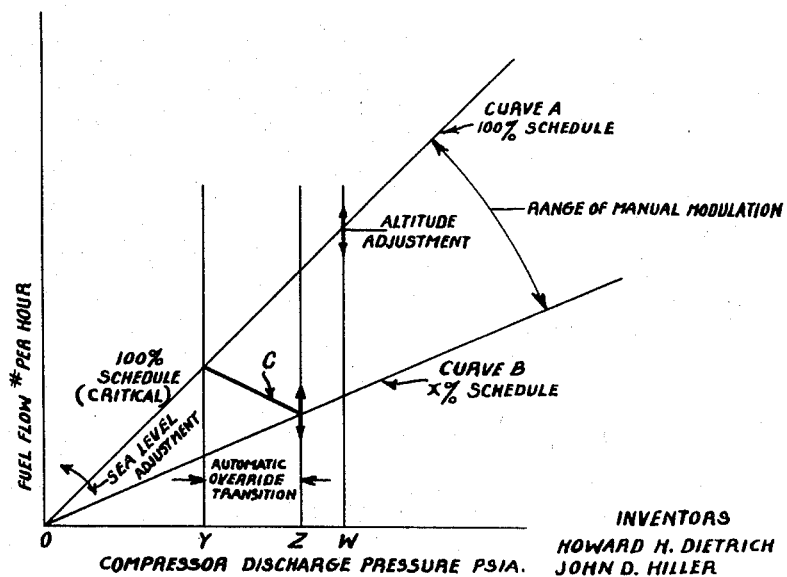
Figure 2 is a graph depicting the fuel flow schedule, modulation of the schedule, altitude adjustment thereof, and sea level adjustment thereof.

The operation of the fuel control will be described with reference to the graph depicted in Fig. 2 in which the ordinate represents fuel flow in pounds per hour and the abscissa represents compressor discharge pressure in pounds per square inch absolute. At the origin of the graph in Fig. 2, the fuel flow per hour is zero and the compressor discharge pressure is zero p.s.i.a. The curve A represents a 100% fuel schedule and is a linear function of compressor discharge pressure. The curve B, also a linear function of compressor discharge pressure, represents X% (any desired percentage) of the 100% schedule. When the afterburner fuel control is armed, the pilot can manually modulate the fuel flow schedule between that of curve B and that of curve A by moving the throttle lever between the afterburner start position and wide open when compressor discharge pressure equals or exceeds a value of Z. By moving the throttle lever 45, the pilot will impart rotation of the shaft 101 and, thus, to the throttle cam 103 so as to position the follower 104, the lever 108 and the throttle input gear 109 of the differential 89. As compressor discharge pressure varies above a value indicated by letter Z, the pilot has full modulation control, and the input gear 147 of the differential 89, which is controlled by the compressor discharge pressure cam 95 and its follower 97 merely assure that the linear relationship between the amount of fuel supplied and compressor discharge pressure will be maintained.

However, below compressor discharge pressure indicated by point Y, a 100% fuel schedule, as indicated by curve A, is maintained irrespective of the setting of the pilot's throttle lever. This is accomplished by the rise 94a on the throttle reset cam 94. The cam 94 also automatically reschedules fuel flow along curve C between the values Y and Z of compressor discharge pressure to prevent afterburner flame blowout. Thus, when the roller 96 engages the rise 94a on the throttle reset cam, the end 133 of the lever 132 will engage pin 104 so as to override the throttle cam 103 and automatically schedule fuel flow in accordance with curves A and C.

The 100% fuel flow schedule curve A may be manually adjusted to alter its slope about the origin by adjusting the position of the fulcrum point 153 on the lever 152 by rotating stud 156. In addition, the slope of curve A may be regulated about and below a compressor discharge pressure of a value W, as indicated in Fig. 2, by adjusting the axial position of the three-dimensional compressor discharge pressure cam 95 through the stud 139, which constitutes an altitude adjustment. The altitude adjustment can be made independently without effecting the 100% fuel flow schedule above a compressor discharge pressure of a value W, as indicated in Fig. 2.

Bellcrank 91 senses compressor discharge pressure as a function of the height of piston 73. The gear train 93 imparts angular movement to the splined shaft 92. The pressure cam 95 delivers a pressure signal to the differential 89 through the follower 97. Between compressor discharge values of zero and value indicated by point Y, the throttle reset cam 94 will sense pressure. The rise 94a on the cam 94 extends throughout a range of zero to Y p.s.i.a. and restricts the throttle input arm 108 of the differential 89 to the 100% schedule, thereby overriding any setting of the throttle cam 103 other than 100%. However, above compressor discharge pressure of Z p.s.i.a., the throttle reset cam follower 96 engages the dwell 94b so as to permit full manual modulation of the fuel schedule between curves B and A through the throttle cam 103.

With particular reference to Fig. 25, the throttling type fuel control section which may be controlled by the computer hereinbefore described, is schematically shown, similar parts of the throttling and bypass type fuel flow sections being indicated by similar numerals. The inlet pressure throttling type fuel section differs primarily from the bypass system in using a throttle valve 400 for regulating the pressure of fuel at the inlet 61 of the metering valve 63. The throttle valve 400 is disposed adjacent the inlet 60 of the fuel flow section and comprises a plunger having a throttling surface 401, the plunger 400 being urged upwardly as viewed in the drawing by a spring 402. The pressure of inlet fuel acting on the surface 401 opposes upward movement of the plunger 400. In addition, fuel under pressure may be supplied to chamber 403 for assisting the spring 402 in urging the plunger 400 upwardly so as to throttle the flow of fuel from the inlet 60 to the passage 61.

As in the bypass type fuel flow section, a predetermined pressure differential, for instance 25 p.s.i. is maintained between the inlet 61 and the outlet 215 of the metering valve 63 by throttling the flow of fuel between passages 60 and 61. The inlet pressure in passage 60 is picked up by a tube 404 disposed within a filter 405 and communicating with a passage 406. The pressure of inlet fuel is communicated to an annular groove 407 of a stationary porting sleeve 410. The inlet pressure in passage 61 is picked up by tube 408 disposed within a filter 409 and connected to a passage 411 that connects with a bore 412 within which the sleeve 410 is disposed. A plunger 415 is disposed within the upper portion of sleeve 410, the plunger being connected to an armature 416 of a solenoid 417. Thus, the plunger 415 constitutes the solenoid shutdown valve for the throttling type system. The armature 416 is biased downwardly by a spring 418 and when the solenoid winding 417 is energized, the plunger 415 assumes the position depicted in Fig. 25. As seen in the drawing, the plunger 415 has three lands 413, 414 and 420, and a central bore 419. The fuel pressure in the inlet 61 of the metering valve communicates through tube 408 and passage 411 with the bore 419 and a chamber 421 of the pressure regulator valve 77. The pressure regulator valve 77 includes an equal area plunger 425.

The pressure of fuel in the outlet 215 is picked up by a tube 426 disposed within a filter 427 and connecting with a passage 428. The passage 428 communicates with a chamber 429 to which the bottom surface of the plunger 425 is exposed. The plunger 425 is also urged upwardly by a preloaded spring 430 so as to maintain the predetermined pressure differential between the fuel at the inlet 61 and the outlet 215 of the metering valve 63.

The high pressure fuel in passage 406 normally communicates with the inlet port 422 of the regulator valve 77 through passage 423 and the groove between lands 413 and 414 of the solenoid plunger 415. When the solenoid winding 417 is deenergized, the plunger 415 moves downwardly, thereby interconnecting passages 406 and 424 so as to supply high pressure fuel to the chamber 403 and maintain the throttle valve 400 fully closed. However, when the solenoid 417 is energized, flow to passage 424 is controlled by the regulator valve plunger 425 through branch passage 431, inasmuch as the plunger 425 has a land 432 controlling port 422 so as to connect passage 431 either with high pressure fuel supply passage 423 or drain passage 433.

The remaining components of the throttling type fuel flow section are identical in structure and operation to those heretofore described in connection with the bypass valve fuel flow section. That is, the bellows 71 senses compressor discharge pressure and controls the pilot valve 86, which controls the height of the piston 73, the spring 72 interconnecting the piston 73 and the bellows 71. Similarly, the computer output rod 100 is operatively connected to the pilot valve plunger 219 disposed within the follow-up sleeve piston 203, which controls the position of the metering valve element 211.

From the foregoing, it is apparent that the present invention provides a fuel control for an after-burner of a jet engine, which can be readily modified to meet the specific requirements of different engines without any appreciable changes. Furthermore, the metering fuel flow schedule may be completely changed by substituting fuel flow cams of different characteristics. In addition, the fuel metering is unaffected by upstream or downstream pressure variations, and either fuel flow section disclosed herein will meter over a complete fuel flow range at a substantially constant metering head.

While the embodiments of the present invention as herein disclosed, constitute preferred forms, it is to be understood that other forms might be adopted.

What is claimed is as follows:

1. A scheduling means for a fuel control for an afterburner of a turbo jet engine having a turbine driven compressor including, in combination, means responsive to compressor discharge pressure, means controlled by said pressure responsive means for establishing a fuel flow schedule as a function of compressor discharge pressure, manually operable means for modulating said schedule between predetermined limits, and means responsive to compressor discharge pressure effective to disable the manually operative means when the compressor discharge pressure is below a preselected value.

2. A scheduling means for a fuel control for an afterburner of a turbo jet engine having a turbine driven compressor including, in combination, means responsive to compressor discharge pressure, means controlled by said pressure responsive means for establishing a fuel flow schedule as a function of compressor discharge pressure, manually operable means for modulating said schedule between predetermined limits when the compressor discharge pressure is above a preselected value, and automatically operable means for overriding said manually operable modulating means when the compressor discharge pressure is below said preselected value.

3. A scheduling means for a fuel control for an afterburner of a turbine driven compressor including, in combination, means responsive to compressor discharge pressure, means controlled by said pressure responsive means for establishing a fuel flow schedule as a function of compressor discharge pressure, manually operable means for modulating said schedule between predetermined limits when the compressor discharge pressure is above a first selected value, means for maintaining a 100% schedule when the compressor discharge pressure is below a second preselected value, and automatic means operable to override said manually operable modulating means when the compressor discharge pressure is between said first and second preselected values.

4. In a fuel control for an afterburner of a turbo jet engine having a turbine driven compressor, a computer including, in combination; a compressor discharge pressure cam, the position of which varies with variation in compressor discharge pressure; a throttle reset cam, the position of which varies with variations in compressor discharge pressure; a throttle cam, the position of which may be manually varied; differential means having a pair of input members and an output member; a compressor discharge pressure cam follower operatively connected to one input member; a throttle reset cam follower; a throttle cam follower; an element operatively connected with said throttle reset and throttle cam followers for actuating the other input member whereby the output member may be positioned by variation in the positions of any one, any combination of, or all of said cams; and means operable by said output member for establishing a fuel flow schedule for said fuel control.

5. In scheduling means for a fuel control for an afterburner of a turbo jet engine having a turbine driven compressor, a computer including, in combination; a rotatable compressor discharge pressure cam, the angular position of which varies with variation in compressor discharge pressure; a rotatable throttle reset cam, the angular position of which varies with variations in compressor discharge pressure; a throttle cam, the position of which may be manually varied; differential means having a pair of input members and an output member; a compressor discharge pressure cam follower connected to one input member; a throttle reset cam follower; a throttle cam follower; means operatively connected with said throttle reset and throttle cam followers for actuating the other input member whereby the output member may be positioned in accordance with variation in the position of either or both of said input members; and means operable by said output member for establishing a fuel flow schedule for said afterburner.

6. The combination recited in claim 5 including a shaft, said compressor discharge pressure cam and said throttle reset cam being drivingly connected with said shaft, and means responsive to compressor discharge pressure for rotating said shaft upon variation in value of compressor discharge pressure.

7. The combination recited in claim 5 including a shaft, said compressor discharge pressure cam being connected to rotate with said shaft although free to move axially relative thereto, and means responsive to compressor discharge pressure for imparting rotation to said shaft upon variation in the value of compressor discharge pressure.

8. The combination recited in claim 7 including means for shifting said compressor discharge pressure cam axially relative to said shaft, said compressor discharge pressure cam being three dimensional whereby axial movement thereof varies its base circle.

9. The combination recited in claim 5 wherein said last recited means includes a lever having an adjustable intermediate fulcrum, and means for varying the position of said fulcrum.

10. A scheduling means for a fuel control for an afterburner of a turbo jet engine having a turbine driven compressor including, in combination, means responsive to compressor discharge pressure, means controlled by said pressure responsive means for establishing a fuel flow schedule as a function of compressor discharge pressure, and altitude adjustment means for altering the slope of said schedule below a predetermined compressor discharge pressure without changing the 100% fuel flow schedule above said predetermined value of compressor discharge pressure.

11. In a scheduling means for a fuel control for an afterburner of a turbo jet engine having a turbine driven compressor, a computer including, in combination; a compressor discharge pressure cam, the position of which varies with variation in compressor discharge pressure; a throttle reset cam, the position of which varies with variation in compressor discharge pressure; a throttle cam, the position of which can be manually varied; a throttle lever having a lost motion connection with said throttle cam permitting an actuation of said throttle cam only within a predetermined range of throttle lever movement; differential means having a pair of input members and an output member; a compressor discharge pressure cam follower connected to one input member; a throttle reset cam follower; a throttle cam follower, an element connected with said throttle reset and throttle cam follower for actuating the other input member whereby the output member may be positioned by variation in the positions of any one, any combination of, or all of said cams; and means operable by said output member for establishing a fuel flow schedule for said afterburner.

12. The combination set forth in claim 11 wherein said differential means combines differential gearing.

13. The combination set forth in claim 12 wherein said throttle reset cam follower is connected to an input gear of said differential gearing.

14. The combination set forth in claim 11 wherein the output member of said differential means is operatively connected with a fuel flow cam for positioning the same.

15. A fuel control for a jet engine afterburner comprising, in combination, a fuel metering valve, pressure responsive means adapted to respond to a pressure indicative of engine air flow, a fuel scheduling cam moved by the pressure responsive means, a manually operable fuel control, differential means receiving a first input from the said cam and a second input from the manually operable control and having an output proportional to the sum of the inputs, override means driven by the pressure responsive means and coupled to the second input means to override the manually operable control and drive the second input means when the controlling pressure is below a predetermined level, and a driving connection from the differential means output to the fuel metering valve.

16. A fuel control for a jet engine afterburner comprising in combination, a fuel metering valve, pressure responsive means adapted to respond to a pressure indicative of engine air flow, a three-dimensional fuel scheduling cam moved in one dimension by the pressure responsive means, a manually operable fuel control, differential means receiving a first input from the said cam and a second input from the manually operable control and having an output proportional to the sum of the inputs, override means driven by the pressure responsive means and coupled to the second input means to override the manually operable control and drive the second input means when the controlling pressure is below a predetermined level, adjustable means to move the three-dimensional cam in a second dimension to vary the fuel schedule, and a driving connection from the differential means output to the fuel metering valve.

17. A fuel control for a jet engine afterburner comprising, in combination, a fuel metering valve, pressure responsive means adapted to respond to a pressure indicative of engine air flow, a three-dimensional fuel scheduling cam moved in one dimension by the pressure responsive means, a manually operable fuel control, differential means receiving a first input from the said cam and a second input from the manually operable control and having an output proportional to the sum of the inputs, override means driven by the pressure responsive means and coupled to the second input means to override the manually operable control and drive the second input means when the controlling pressure is below a predetermined level, adjustable means to move the three-dimensional cam in a second dimension to vary the fuel schedule, and a driving connection from the differential means output to the fuel metering valve including manually adjustable variable ratio transmission means effective to vary the fuel schedule proportionally throughout the entire range of movement of the differential means output.

References Cited in the file of this patent

UNITED STATES PATENTS

| | | |
|---|---|---|
| 2,422,808 | Stokes | June 24, 1947 |
| 2,499,232 | Strub | Feb. 28, 1950 |
| 2,638,742 | Carey | May 19, 1953 |
| 2,700,275 | Chandler et al. | Jan. 25, 1955 |
| 2,705,864 | Peters | Apr. 12, 1955 |
| 2,737,016 | Day | Mar. 6, 1956 |